(12) United States Patent
Yakushev et al.

(10) Patent No.: US 9,110,603 B2
(45) Date of Patent: Aug. 18, 2015

(54) IDENTIFYING MODIFIED CHUNKS IN A DATA SET FOR STORAGE

(71) Applicant: International Business Machines Corporation, Armonk, NY (US)

(72) Inventors: Mark L. Yakushev, San Jose, CA (US); Mark A. Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/103,712

(22) Filed: Dec. 11, 2013

(65) Prior Publication Data

US 2014/0149699 A1   May 29, 2014

Related U.S. Application Data

(63) Continuation of application No. 13/103,977, filed on May 9, 2011, now Pat. No. 8,612,392.

(51) Int. Cl.
*G06F 7/00*   (2006.01)
*G06F 3/06*   (2006.01)
*G06F 17/30*  (2006.01)

(52) U.S. Cl.
CPC ............ *G06F 3/0653* (2013.01); *G06F 3/0604* (2013.01); *G06F 3/0608* (2013.01); *G06F 3/0641* (2013.01); *G06F 3/0673* (2013.01); *G06F 3/0688* (2013.01); *G06F 3/0689* (2013.01); *G06F 17/30159* (2013.01)

(58) Field of Classification Search
USPC ................ 707/654, 693, 700, 692, 699, 697; 711/159, 162, 166, 202
See application file for complete search history.

(56) References Cited

U.S. PATENT DOCUMENTS

| | | | |
|---|---|---|---|
| 6,880,102 B1 | 4/2005 | Bridge | |
| 7,747,584 B1 | 6/2010 | Jernigan, IV | |
| 8,046,509 B2 | 10/2011 | Bondurant | |
| 8,117,173 B2 | 2/2012 | Gurevich et al. | |
| 8,140,821 B1* | 3/2012 | Raizen et al. | 711/202 |
| 8,156,306 B1* | 4/2012 | Raizen et al. | 711/202 |
| 8,527,482 B2* | 9/2013 | Heller et al. | 707/699 |

(Continued)

OTHER PUBLICATIONS

Deepavali Bhagwat, Kaye Eshghi, Darrell D.E. Long, Mark Lillibridge, Extreme Binning: Scalable, Parallel Deduplication for Chunk-based File Backup, IEEE Mascots, 2009, London, UK, Sep. 21, 2009.*

(Continued)

*Primary Examiner* — Hung T Vy
(74) *Attorney, Agent, or Firm* — David W. Victor; Konrad, Raynes, Davda and Victor LLP (57) ABSTRACT

Provided are a computer program product, system, and method for identifying modified chunks in a data set for storage. Information is maintained on a data set of variable length chunks, including a digest of each chunk and information to locate the chunk in the data set. Modifications are received to at least one of the chunks in the data set. A determination is made of chunks including data affected by the modifications. The determined chunks including data affected by the modifications are processed to determine new chunks and for each determined new chunk and for each determined new chunk, new digest information of the new chunk. The new digest information on the at least one new chunk and information to locate the new chunk in the data set are added to the set information.

18 Claims, 10 Drawing Sheets

(56) References Cited

U.S. PATENT DOCUMENTS

| | | | |
|---|---|---|---|
| 8,626,723 B2* | 1/2014 | Ben-Shaul et al. | 707/692 |
| 2008/0133561 A1* | 6/2008 | Dubnicki et al. | 707/101 |
| 2009/0049260 A1 | 2/2009 | Upadhyayula | |
| 2009/0063795 A1 | 3/2009 | Yueh | |
| 2009/0259701 A1 | 10/2009 | Wideman et al. | |
| 2009/0319772 A1 | 12/2009 | Singh et al. | |
| 2010/0042790 A1 | 2/2010 | Mondal et al. | |
| 2010/0049726 A1 | 2/2010 | Yasa et al. | |
| 2010/0088277 A1 | 4/2010 | Rao et al. | |
| 2010/0088296 A1 | 4/2010 | Periyagaram et al. | |
| 2010/0094817 A1* | 4/2010 | Ben-Shaul et al. | 707/697 |
| 2010/0114833 A1 | 5/2010 | Mu | |
| 2011/0016095 A1 | 1/2011 | Anglin et al. | |
| 2011/0029497 A1 | 2/2011 | Benhase et al. | |
| 2011/0035376 A1 | 2/2011 | Kirshenbaum | |
| 2012/0158672 A1 | 6/2012 | Oltean et al. | |
| 2012/0290537 A1 | 11/2012 | Smith et al. | |
| 2012/0290546 A1 | 11/2012 | Smith et al. | |

OTHER PUBLICATIONS

L. Aronovich et al., "The Design of a Similarity Based Deduplication System", Systor 2009, 14 pgs.

Muthiacharoen et al. "A Low-bandwidth Network File System", MIT Laboratory for Computer Science and NYU Department for Computer Science, 2001, 14 pgs.

"Data Deduplication", Wikipedia, (online), 2011, (retrieved from the Internet on Apr. 16, 2011), retrieved from the Internet at URL:http://wikipedia.org/w/index.php?title=Data_depudlication&printable=yes, 6 pgs.

"How NetApp Depuplication Works—A Primer", (online), dated Apr. 7, 2010, (retrieved from the Internet on Apr. 17, 2011), retrieved from the Internet at URL:http:/netaapptips.com/2010/04/07/how-netapp-deduplication-works-a-primer/, 6 pgs.

C. Alervez., "NetApp Deduplication for FAS and V-Series Deployment and Implemention Guide", dated Feb. 2011, Technical Report for NetApp, 75 pgs.

B. Lewis, "Deduplication Comes of Age", (online), (retrieved from the Internet on Mar. 23, 2011), retrieved from the Internet at URL:http:www.netapp.com/us/communities/tech-ontap/dedupe-0708.html, 3 pgs.

"Rabin Fingerprint", Wikipedia, (online), dated Dec. 15, 2010, (retrieved from the Internet on Apr. 7, 2011), retrieved from the Internet at URL:http://wikipedia.org/w/index.php?title=Rabin_fingerprint&printable=yes, 2 pgs.

D. Cannon., "Data Deduplcation and Tivoli Storage Manager", IBM Software Group, dated Mar. 2009, 27 pgs.

"Changed Block Tracking (CBT) on Virtual Machines", vmware Knowledge Base article, (online), (retrieved from the Internet on Mar. 23, 2011), retrieved from the Internet at URL:http://kb.vmware.com/selfservice/microsites/search.do?language=en_U . . . , 2 pgs.

P. Mell, "THe NIST Definition of Cloud Computing (Draft)", National Institute of Standards and Technology, Special Publication 800-145 (draft), Jan. 2011, pp. 1-7.

Preliminary Amendment, dated May 17, 2012, for U.S. Appl. No. 13/103,977, filed May 9, 2011, entitled, "Identifying Modified Chunks in a Data Set for Storage", by inventors Mark L. Yakushev et al. pp. 1-7.

Office Action, dated Sep. 27, 2012, for U.S. Appl. No. 13/103,977, filed May 9, 2011, entitled, "Identifying Modified Chunks in a Data Set for Storage", by inventors Mark L. Yakushev et al. pp. 1-20.

Response to Office Action, dated Dec. 26, 2012, for U.S. Appl. No. 13/103,977, filed May 9, 2011, entitled, "Identifying Modified Chunks in a Data Set for Storage", by inventors Mark L. Yakushev et al. pp. 1-10.

Final Office Action, dated Feb. 14, 2013, for U.S. Appl. No. 13/103,977, filed May 9, 2011, entitled, "Identifying Modified Chunks in a Data Set for Storage", by inventors Mark L. Yakushev et al. pp. 1-11.

Response to Final Office Action, dated Apr. 15, 2013, for U.S. Appl. No. 13/103,977, filed May 9, 2011, entitled, "Identifying Modified Chunks in a Data Set for Storage", by inventors Mark L. Yakushev et al. pp. 1-9.

Supplemental Amendment, dated May 14, 2013, for U.S. Appl. No. 13/103,977, filed May 9, 2011, entitled, "Identifying Modified Chunks in a Data Set for Storage", by inventors Mark L. Yakushev et al. pp. 1-7.

Notice of Allowance, dated Aug. 2, 2013, for U.S. Appl. No. 13/103,977, filed May 9, 2011, entitled, "Identifying Modified Chunks in a Data Set for Storage", by inventors Mark L. Yakushev et al. pp. 1-14.

Preliminary Amendment, dated May 17, 2012, for U.S. Appl. No. 13/474,624, filed May 17, 2012, entitled, "Identifying Modified Chunks in a Data Set for Storage", by inventors Mark L. Yakushev et al. pp. 1-7.

Office Action, dated Sep. 28, 2012, for U.S. Appl. No. 13/474,624, filed May 17, 2012, entitled, "Identifying Modified Chunks in a Data Set for Storage", by inventors Mark L. Yakushev et al. pp. 1-13.

Response to Office Action, dated Dec. 26, 2012, for U.S. Appl. No. 13/474,624, filed May 17, 2012, entitled, "Identifying Modified Chunks in a Data Set for Storage", by inventors Mark L. Yakushev et al. pp. 1-6.

Notice of Allowance, dated Jan. 25, 2013, for U.S. Appl. No. 13/474,624, filed May 17, 2012, entitled, "Identifying Modified Chunks in a Data Set for Storage", by inventors Mark L. Yakushev et al. pp. 1-12.

* cited by examiner

FIG. 1

Set Information

FIG. 2

Deduplication Index Entry

FIG. 3

Chunk Storage Information Entry

IDENTIFYING MODIFIED CHUNKS IN A DATA SET FOR STORAGE

CROSS-REFERENCE TO RELATED APPLICATION

This application is a continuation of U.S. patent application Ser. No. 13/103,977, filed May 9, 2011, which application is incorporated herein by reference in its entirety.

BACKGROUND OF THE INVENTION

1. Field of the Invention

The present invention relates to a computer program product, system, and method for identifying modified chunks in a data set for storage.

2. Description of the Related Art

Data deduplication is a data compression technique for eliminating redundant data to improve storage utilization. Deduplication reduces the required storage capacity because only one copy of a unique data unit, also known as a chunk, is stored. Disk based storage systems, such as a storage management server and Volume Tape Library (VTL), may implement deduplication technology to detect redundant data chunks, such as extents or blocks, and reduce duplication by avoiding redundant storage of such chunks.

A deduplication system operates by dividing a file into a series of chunks, or extents. The deduplication system determines whether any of the chunks are already stored, and then proceeds to only store those non-redundant chunks. Redundancy may be checked with chunks in the file being stored or chunks already stored in the system.

An object may be divided into chunks using a fingerprinting technique such as Karp-Rabin fingerprinting. Redundant chunks are detected using a hash function, such as MD5 (Message-Digest Algorithm 5) or SHA-1 (Secure Hash Algorithm 1), on each chunk to produce a hash value for the chunks and then compare those hash values against hash values of chunks already stored on the system. Typically the hash values for stored chunks are maintained in an index (dedup index). A chunk may be uniquely identified by a hash value, or digest, and a chunk size. The hash of a chunk being considered is looked-up in the dedup index. If an entry is found for that hash value and size, then a redundant chunk is identified, and that chunk in the set or object can be replaced with a pointer to the matching chunk maintained in storage.

In a client-server software system, the deduplication can be performed at the data source (client), target (server) or on a de-duplication appliance connected to the server. The ability to deduplicate data at the source or at the target offers flexibility in respect to resource utilization and policy management. Typically, the source and target systems have the following data backup protocol:

1. Source identifies data extent D in file F.
2. Source generates a hash value h(D) for the data extent D.
3. Source queries the target if the target already has a data extent with hash value h(D) and size 1(D).
4. If the target responds "yes", the source simply notifies the target that extent with hash h(D) and size 1(D) is a part of file F.
5. If the target responds "no", the source sends the data extent D with its hash h(D) and size 1(D) to the target. Target stores D in a storage pool and enters h(D) and 1(D) into the de-dup index.
6. If more extents are to be processed, go to Step 1.

In fixed size block or variable size block where chunk boundaries can be determined without examining the data (e.g. without fingerprinting), the changed physical blocks can be mapped directly to deduplicated copies of the blocks in storage. However, there is a need in the art to provide improved techniques for determining changed chunks in systems having variable size chunks, whose boundaries are determined by examining the data (e.g. fingerprinting), such as variable size blocks and extents.

SUMMARY

Provided are a computer program product, system, and method for identifying modified chunks in a data set for storage. Information is maintained on a data set of variable length chunks, including a digest of each chunk and information to locate the chunk in the data set. Modifications are received to at least one of the chunks in the data set. A determination is made of at least one range of least one of the chunks including data affected by the modifications, wherein each range identifies one chunk or sequential chunks having data affected by the modifications. The at least one chunk in each range is processed to determine at least one new chunk in each range, and for each determined new chunk, a digest of the new chunk. A determination is made as to whether at least one chunk outside of the at least one range has changed. For each determined at least one chunk outside of the at least one range that has changed, a determination is made of at least one new chunk and a new digest of the at least one new chunk. Adding to the set information the new digest information on the at least one new chunk and information to locate the new chunk in the data set.

DETAILED DESCRIPTION

Described embodiments provide techniques to determine variable length chunks in a data set that have changed due to modifications, such as updates, deletions and additions to the chunks in the data set. The variable length chunks that have changed may then be backed up to a backup server in a manner that avoids backing up duplicate chunks. To determine the variable length chunks that have changed, at determination is made of ranges of chunks including data affected by the modifications. The ranges of chunks are processed to determine new chunks in the ranges and a digest of any new chunks, where new chunks comprise changed data in a chunk or a previous chunk existing on a new boundary in the data set. Determinations are also made as to whether chunks outside of the range have changed, and new digests calculated for the new changed chunks. The set information for the data set is updated to include information on the new digests for the new changed chunks.

Figure 1:
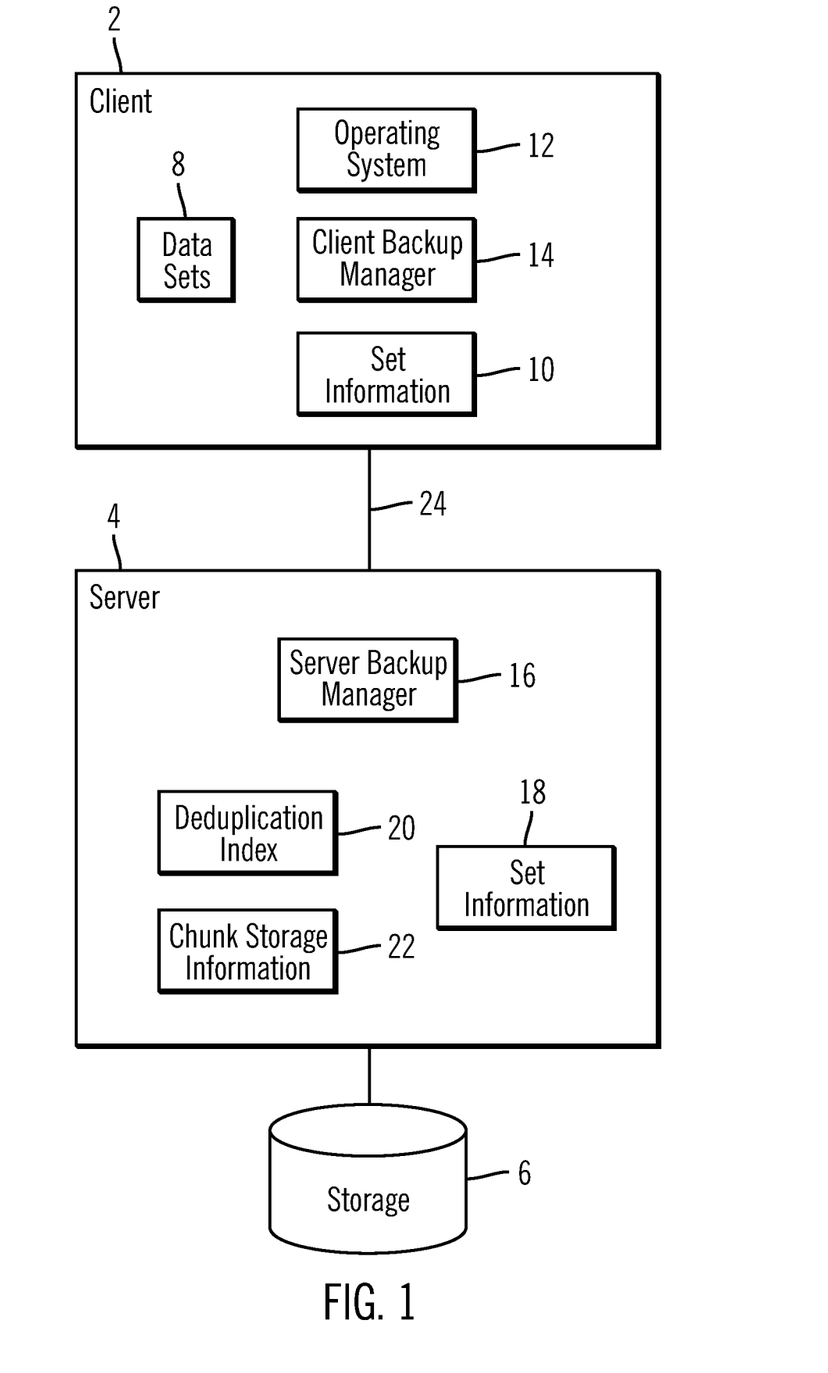
FIG. 1 illustrates a computing environment in which embodiments are implemented.

FIG. 1 illustrates an embodiment of a computing environment having a client 2 and server 4 for backing up data in the client 2 to storage 6. The client maintains data sets 8, such as files or objects, and maintains set information 10 having metadata for each data set, including an ordered list of chunks of data assigned to each set. The client 2 includes an operating system 12 to generate and maintain data sets 8 at the client 2, which data sets 8 may be stored in local storage at the client 2. To backup data sets 8 at the client 2, a client backup manager 14 transfers non-redundant chunks in the data sets 8 to backup to a server backup manager 16 in the server 4.

The server backup manager 16 maintains set information 18 on chunks assigned to data sets provided from one or more clients 2. Further, the server backup manager 16 may maintain a deduplication index 20 to store only one copy of a chunk in the storage 6, although one chunk may be included in multiple data sets. To perform deduplication, upon having a new or unchanged chunk in a data set, the client backup manager 14 may calculate a hash for the chunk and then transfer the hash for the chunk to the server backup manager 16 The server backup manager 16 would then determine whether the deduplication index 20 has a matching hash. If not, the client backup manager 14 sends a full copy of the new or changed chunk in the data set 8 to the server backup manager 16 to store in storage 6. Otherwise, if the deduplication index 20 has a matching copy of the hash, then the client backup manager 14 need not transfer a full copy of the chunk. Instead, the client backup manager 14 may transfer the digest for the chunk and its location in the set.

The server 4 may further maintain chunk information 22 indicating a location in the storage 6 of each chunk included in data sets being backed up at the storage 6.

The client 2 and server 4 components communicate over a connection 24. In one embodiment, the client 2 and server 4 may comprise separate computer systems and the link 24 may comprise a network, such as a local area network (LAN), storage area network (SAN), wide area network (WAN), etc. In further embodiments, the client 2 and server 4 components may be implemented on a single computer system platform, and the link 24 may comprise communication over a bus or via memory.

The storage 6 may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The client 14 and server 16 backup managers may comprise software programs in a memory executed by a processor. In an alternative embodiment, the some portion or all of the programs 14 and 16 may be implemented in a hardware component, such as a dedicated integrated circuit, e.g., Application Specific Integrated Circuit (ASIC), expansion card, etc.

Although the client 14 and server 16 backup managers are shown as separate components, in alternative implementations the functions performed by the client 14 and server 16 backup managers may be implemented in a single program component in a single computer system or in more than two program components in more than two computer devices.

Figure 2:
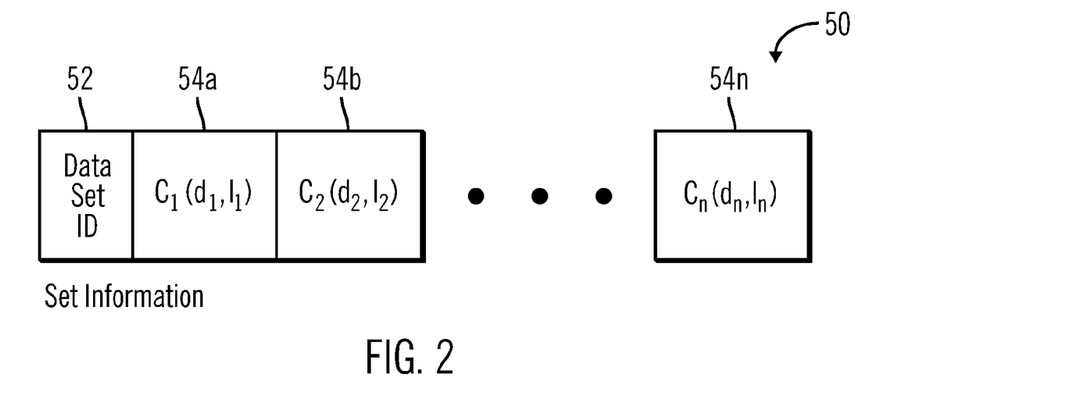
FIG. 2 illustrates an embodiment of set information.

FIG. 2 illustrates an embodiment of set information 50 for one data set maintained in the set information 10, 18. The set information 50 for one data set includes an identifier (ID) 52 of the data set, and one or more chunks 54a, 54b . . . 54n of data assigned to the set 52. In one embodiment, the chunks may be of variable length, i.e., have the same or different lengths. The set information 50 may maintain an ordered list of the chunks ($C_1 \ldots C_n$) indicating the order 1 . . . n in which the chunks appear in the data set. For each chunk ($C_i$), the set information 50 maintains a digest ($d_i$) of the chunk and a length ($l_i$) of the chunk. In this way, the set information 50 provides metadata on the chunks included in the set, such as digest and length, but not the actual data. The digest (d) may be calculated by processing the chunk to generate a unique value for the chunk. For instance, in one embodiment, the digest may comprise a cryptographic digest, such as MD5 (Message-Digest Algorithm 5) or SHA-1 (Secure Hash Algorithm 1), which calculates cryptographic hashes of each chunk in the data set.

Figure 3:
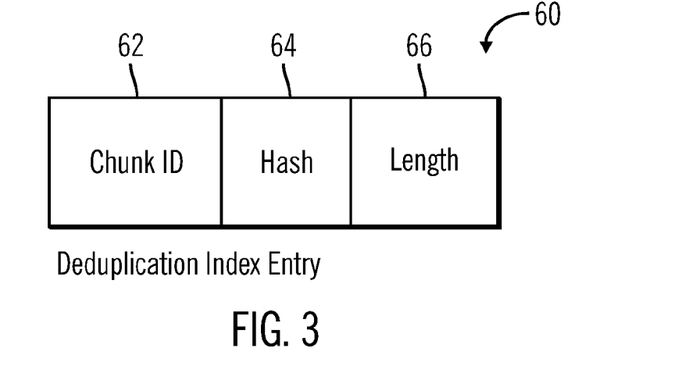
FIG. 3 illustrates an embodiment of a deduplication index entry.

FIG. 3 illustrates an embodiment of a deduplication index entry 60 maintained by the server backup manager 16 for each chunk stored in the storage 6. The index entry 60 includes a chunk identifier (ID) 62 of the chunk in storage 6, a hash value 64 computed from the chunk represented by the chunk ID and a length 66 of the chunk. When determining whether to transmit a full copy of the chunk to the server backup manager 16, the client backup manager 14 may provide the hash of the chunk to the server backup manager 16, and the server backup manager 16 may determine whether one entry 60 in the deduplication index 20 has a hash value 64 and length 66 matching those sent by the client backup manager 14 to determine whether the client 14 needs to transmit the full chunk or just an identifier of the chunk, e.g., the digest and length.

Figure 4:
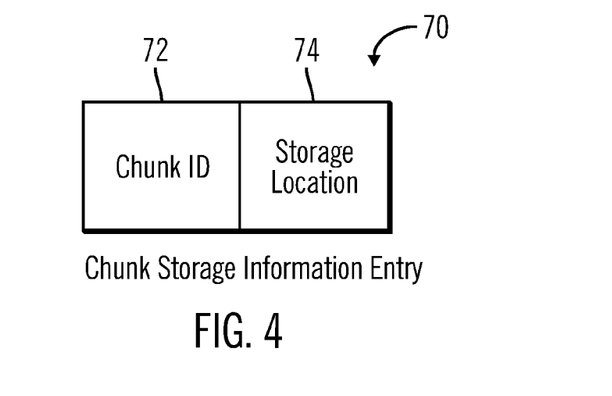
FIG. 4 illustrates an embodiment of a chunk storage information entry.

FIG. 4 illustrates an embodiment of a chunk storage entry 70 the server backup program 16 maintains in the chunk storage information 22 for each chunk maintained in storage 6. The chunk storage entry 70 includes a chunk ID 72 and a storage location 74 in the storage 6 of the identified chunk 72, such as a logical or physical address, identifying where the chunk is stored. The chunk storage information 22 maintains only one copy of each unique variable length chunk.

In this way, the subcomponents of a set, referred to herein as chunk, are stored separately from the sets or files in which they are included. A chunk may comprise an extent of tracks, a block of data or any other definable subunit of data that may be assigned to sets. A set may comprise any grouping of data units, such as a file, object, database, etc.

Figure 5:
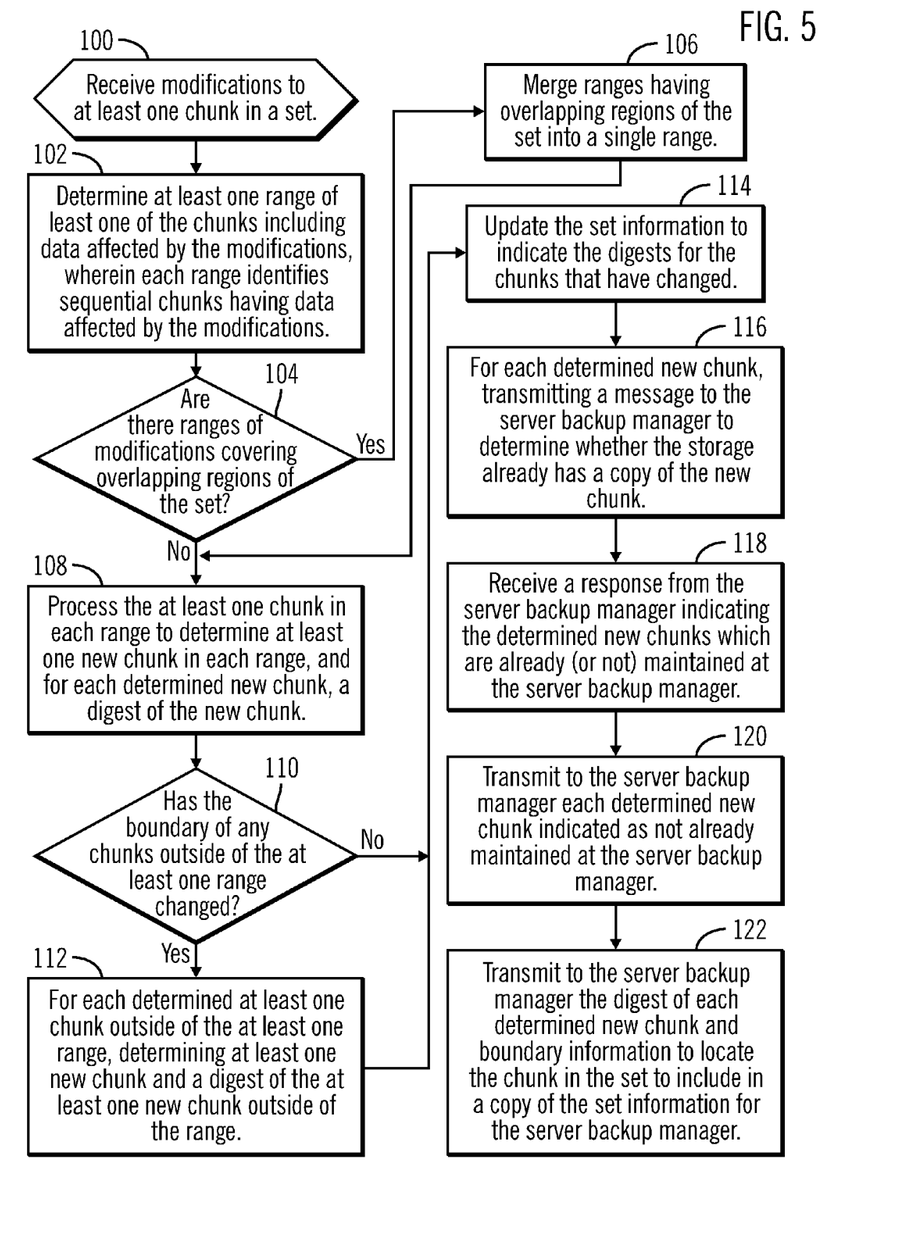
FIGS. 5, 7a, and 7b illustrate embodiments of operations to process chunks in a set to determine modified chunks to transmit to storage.
Figure 6A:
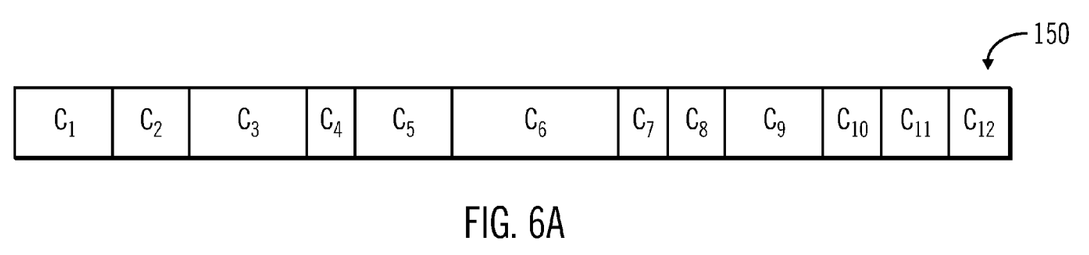
FIGS. 6a, 6b, 6c and 6d illustrate how chunks change and are processed to determine modified chunks.
Figure 6B:
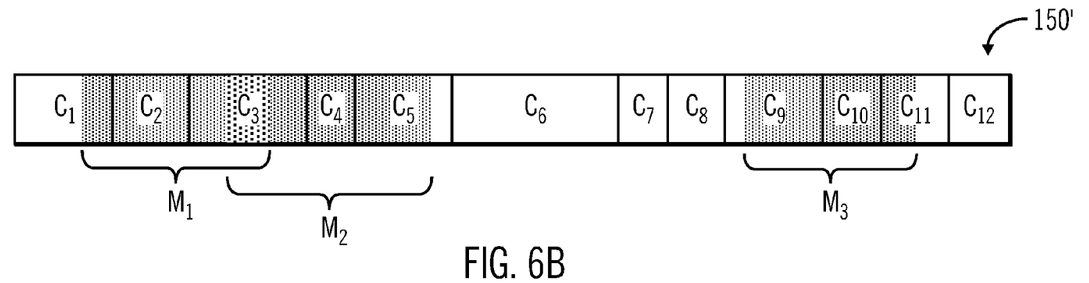
Figure 6C:
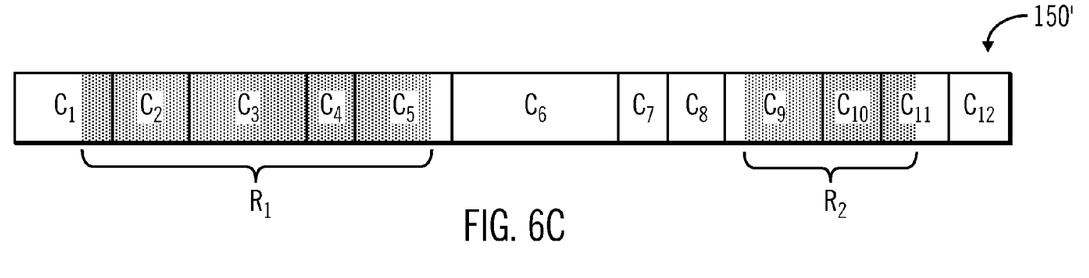

FIG. 5 illustrates an embodiment of operations performed by the client backup manager 14 to determine chunks 54a . . . 54n that have changed in a set 50 and need to be sent to the server backup manager 16 for backup in the storage 6. For instance, FIG. 6a illustrates chunks $C_1$ through $C_{12}$ of variable length that comprise a set 150. FIG. 6b illustrates the chunks $C_1$ through $C_5$ and $C_9$ through $C_{11}$ that are affected by modifications forming ranges of modifications $M_1$, $M_2$, and $M_3$ to set 150 (FIG. 6a) resulting in modified set 150' having modifications which are illustrated as shaded regions of the chunks. A modification may be in the form of data replacement, deletion or insertion. Upon receiving (at block 100) modifications to at least one chunk in the set 150 (FIG. 7a), the client backup manager 14 determines (at block 102) at least one range, e.g., $M_1$, $M_2$, and $M_3$, of least one of the chunks including data affected by the modifications, wherein each range identifies sequential chunks having data affected by the modifications. If (at block 104) there are ranges of modifications $M_1$, $M_2$, and $M_3$ covering overlapping regions in the set 150, then the client backup manager 14 merges (at block 106) ranges having overlapping regions of the set into a single range. FIG. 6c illustrates how the overlapping ranges $M_1$ and $M_2$ in FIG. 6b, which overlap in chunk C3, are merged into range $R_1$ and the non-overlapping range $M_3$ becomes the second range $R_2$.

Figure 6D:
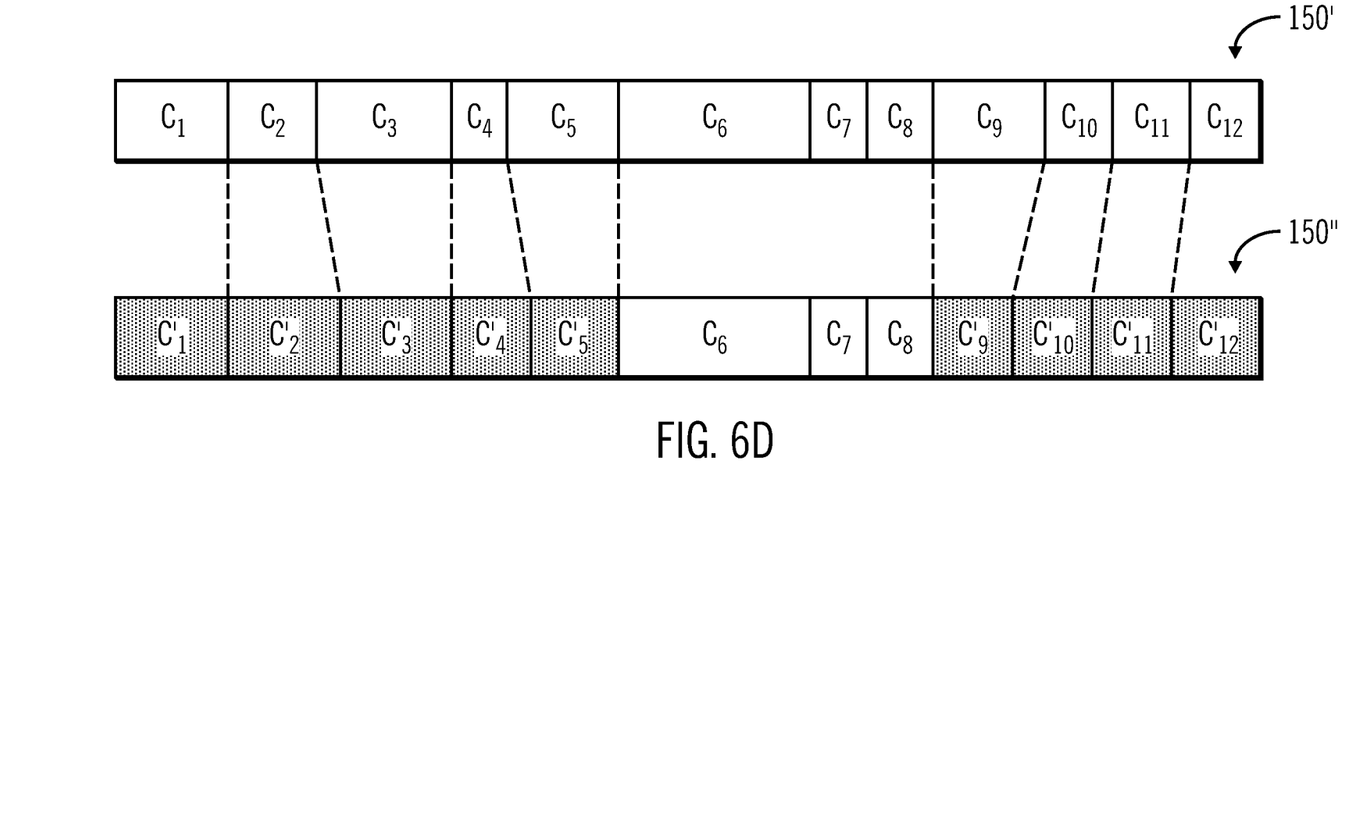

If (from the no branch of block 104) there are no overlapping ranges or the ranges have been merged (from block 106), the client backup manager 14 processes the at least one chunk in each range to determine (at block 108) at least one new chunk in each range, and for each determined new chunk, a digest of the new chunk and boundary location in the set. The processing of a range may result in a determination of new chunks having a different layout in the same range of modified chunks, where at least one of the determined new chunks for one range are located at different boundaries in the set than the chunks in the range before the modifications. Further, the determined new chunks in the range may comprise a different number of chunks in the range having modifications. For instance, FIG. 6d shows a set 150" having the determined new chunks $C'_1$, $C'_2$, $C'_3$, $C'_4$, and $C'_5$ in the first range $R_1$ that appear at different boundaries or locations in the range $R_1$. Further, the determined new chunks $C'_9$, $C'_{10}$, $C'_{11}$, and $C'_{12}$ in the second modified range R1 also are determined to be at different boundaries or locations in the set 150". In FIG. 6d, certain of the chunks $C_6$, $C_7$, and $C_8$ remain unchanged and at the same location in the set 150" as in the pre-modified set 150. An algorithm for determining the boundaries of variable length blocks are strings may be used to determine the boundaries for chunks in the modified range, such as the Karp-Rabin fingerprinting algorithm.

The client backup program 14 further determines (at block 110) whether any chunks outside of the at least one range, e.g., $R_1$ and $R_2$, are changed. In certain embodiments, determining whether at least one chunk outside of the range has changed may comprise determining whether the at least one chunk outside of the range starts at a different boundary in the set than before the modifications. If (at block 110) a chunk outside of a range changed as a result of the modifications, then for each determined at least one chunk outside of the at least one range that has changed, the client backup program 14 determines (at block 112) at least one new chunk and a digest of the at least one new chunk starting from the location of the chunk outside of the range being considered. After calculating new chunks for chunks outside of the range (from block 112) or if there are no chunks outside of the range that start at a different boundary (from the no branch of block 110), the client backup program 14 updates (at block 114) the set information 50 to indicate the new digests for the chunks that have changed and the new boundary locations of those chunks.

For each determined new chunk, the client backup manager 14 transmits (at block 116) a message to the server backup manager 16 to determine whether the storage 6 already has a copy of the new chunk. If the message includes a hash function of the determined new chunk, then the server backup manager 16 may check the deduplication index 20 to see if there is a matching information and returns information on new chunks already at the storage 6 and/or new chunks not already stored in the storage 6. Upon receiving (at block 118) a response from the server backup manager 16, the client backup manager 14 transmits (at block 120) to the server backup manager 16 each determined new chunk indicated as not already maintained at the storage 6 and transmits (at block 122) to the server backup manager 16 the digest of each determined new chunk and boundary information to locate the new chunk in the set to include in the set information 18 used by the server backup manager 16.

Figure 7A:
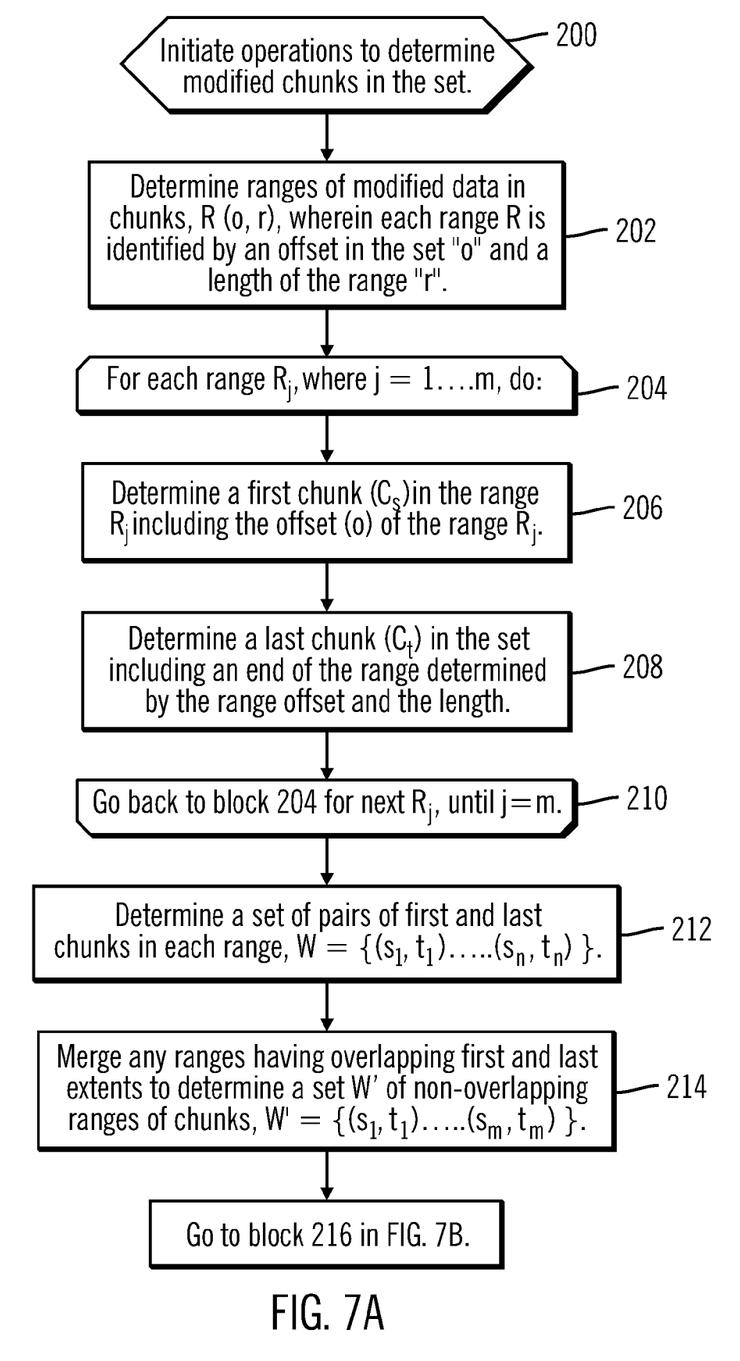
Figure 7B:
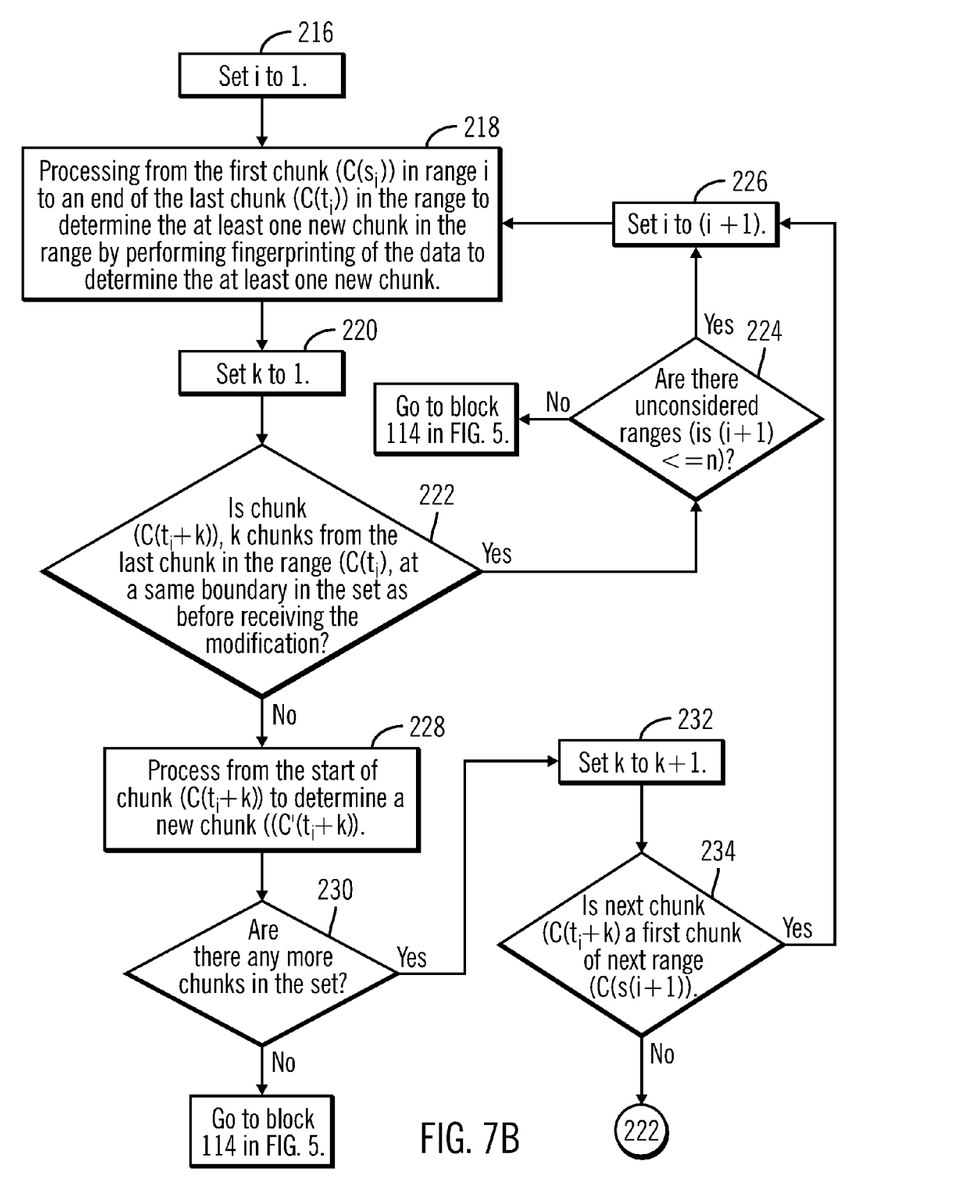

FIGS. 7a and 7b illustrate a further embodiment of operations performed by the client backup manager 14 to perform the operations described in FIG. 5, such as determine ranges of chunks affected by modifications, merge overlapping ranges, process chunks to determine new chunks in ranges and outside of ranges. Upon initiating (at block 200) operations to determine modified chunks in the set, e.g. set 150 (FIG. 6a), the client backup manager 14 determines (at block 202) ranges of modified data in sequential chunks, R (o, r), wherein each range R is identified by an offset "o" in the set and a length of the range "r". The client backup manager 14 then performs a loop of operations at blocks 204-210 for each determined range $R_j$, where j=1 . . . m, and there are m ranges. FIG. 6b shows ranges of modified chunks $M_1$, $M_2$, $M_3$. The client backup manager 14 determines (at block 206) a first chunk ($C_s$) in the range $R_j$ including the offset (o) of the range $R_j$ and determines (at block 208) a last chunk ($C_t$) in the set including an end of the range determined by the range offset and the length. In one embodiment, the offset $o_j$ of the range $R_j$ may be used to determine the first changed chunk ($C_s$), such that $l_1+l_2+ \ldots +l_{s-1}<o_j \leq l_1+l_2+ \ldots +ls$ where $l_1 \ldots l_s$ are the sizes or lengths of the data chunks $C_1 \ldots C_s$. In one embodiment, the length of the range $R_j$ is used to determine the last changed chunk ($C_t$), such that $l_1+l_2+ \ldots +l_{t-1}< (o_j+r_j) \leq l_1+l_2+ \ldots +l_t$, where $l_1 \ldots l_t$ are sizes of the data chunks $C_1 \ldots C_t$.

The client backup manager 14 may then determine (at block 212) a set of pairs of first and last chunks in each range, $W=\{(s_1, t_1) \ldots (s_n, t_n)\}$. For instance, in FIG. 6b, the set of pairs of first and last chunks for modification ranges $M_1$, $M_2$, and $M_3$ would comprise $W=\{(C_1, C_3), (C_3, C_5),$ and $(C_9, C_{11})\}$. The client backup manager 14 may merge (at block 214) any ranges of modifications having overlapping first and last extents, such as ranges $M_1$ and $M_2$ in FIG. 6b, to determine a set W' of non-overlapping ranges of chunks, $W'=\{(s_1, t_1) \ldots (s_m, t_m)\}$, where m≤n. For instance, in FIG. 6b, the overlapping ranges $M_1$ and $M_2$ are merged into non-overlapping range $R_1$ in FIG. 6c

From block 214, control proceeds to block 216 in FIG. 7b to start the process of processing the chunks in the modified set, e.g., set 150' (FIGS. 6a, 6b), to determine a set of new chunks, e.g., set 150" shown in FIG. 6d.

To start processing chunks in the ranges, the client backup manager 14 sets (at block 216) a variable i to 1 and then processes (at block 218) from the first chunk ($C(s_i)$) in range i to an end of the last chunk ($C(t_i)$) in the range to determine the at least one new chunk in the range i. The client backup manager 14 may determine the new variable length chunks by performing fingerprinting of the data to determine the at least one new chunk, such as the Karp-Rabin fingerprinting process. The number of chunks determined in the range may differ, i.e., be fewer or more, than the original number of chunks in the range before the modifications.

After determining (at block 218) the new chunks in the range of modified chunks, the client backup manager 14 determines whether the chunk locations or boundaries between ranges i and (i+1) have changed, requiring determination of the new boundaries. To accomplish this, in one embodiment, the client backup manager 14 sets (at block 220) k to 1 and determines whether chunk $C(t_i+k)$, which is the chunk k chunks from the last chunk ($C(t_i)$) in the range i, is at a same boundary in the set as before receiving the modification, e.g., determines whether the boundary location in the set 150" of $C_6$ has changed (FIG. 6d). If the boundary is not changed, then the client backup manager determines (at block 224) whether there are further unconsidered ranges, e.g., (i+1) is less than or equal to the total number of ranges n. If there are further ranges to consider, then i is incremented (at block 226) and control proceeds back to block 218 to determine new chunks in the new range (i+1). If (at block 224) there are no further ranges to process, then the chunk processing ends, and control proceeds to block 114 in FIG. 5 to transfer any new non-redundant chunks to the server backup manager 16.

If (at block 222) the chunk $C(t_i+k)$ is not at the same boundary in the set as before the modification, then the client backup manager 14 process (at block 228) from the start of chunk ($C(t_i+k)$) to determine a new chunk ($(C'(ti+k))$) at a new boundary. In certain embodiments, the client backup manager 14 may implement a fingerprinting method to detect the new chunk boundary, such as methods used for variable size blocks, e.g., Karp-Rabin fingerprinting. In determining new chunks at blocks 218 and 228, a digest or fingerprint for the chunk may be determined, such as a cryptographic hash of the new chunk, and the boundary location of the new chunk in the set. After determining a new chunk $C'(t_i+k)$ and its new boundary in the set, if (at block 230) there are further chunks in the set to consider, then the client backup manager 14 increments (at block 232) k to k+1 to process the next chunk. If (at block 230) there are no further chunks in the set to process, then new chunk processing ends and control may proceed to block 114 in FIG. 5. If (at block 234) the next chunk ($C(t_i+k)$) is not a first chunk of a next range ($C(s_{(i+1)})$), i.e., is still between ranges, such as chunk $C_7$ or $C_8$ in FIG. 6d, then control proceeds to block 222 to process that next chunk between ranges. If (at block 234) the next chunk ($C(t_i+k)$ is the first chunk of the next range, i.e., $(C(t_i+k)=C(s_{(i+1)})$, then control proceeds to block 226 to process the next range (i+1).

Described embodiments provide techniques to determine variable length chunks in a set that have been modified by determining ranges of sequential modified chunks and processing chunks within such ranges to determine new chunks and their boundaries and then processing chunks outside the ranges to determine changes to such chunks. In this way, by determining those variable length chunks in a set that have changed, only the changed chunks may be communicated to storage. Further, before transmitting changed chunks to the storage, a determination may be made as to whether the storage already has a copy of such new chunks and, if so, only new chunks not already in storage may be saved in the storage to implement deduplication.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 8-10. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
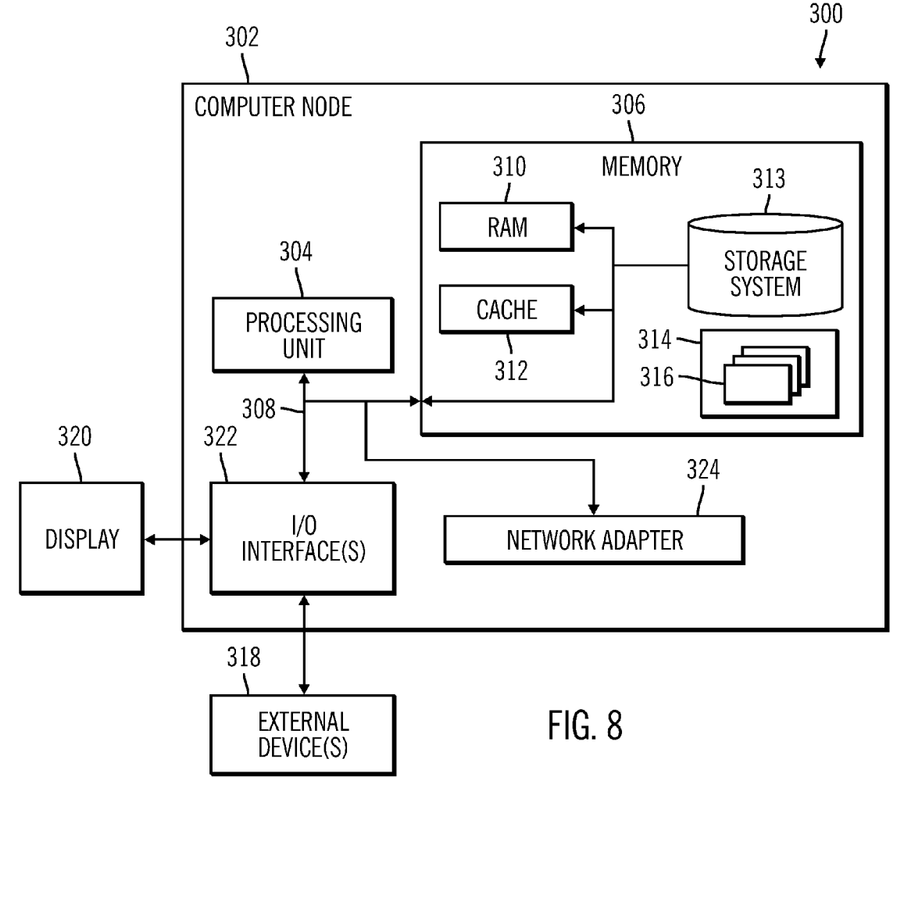
FIG. 8 illustrates an implementation of a node in the network computing embodiment.

FIG. 8 illustrates an example of a cloud computing node 300 which may comprise an implementation of the client 2 and server 4 systems. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 9:
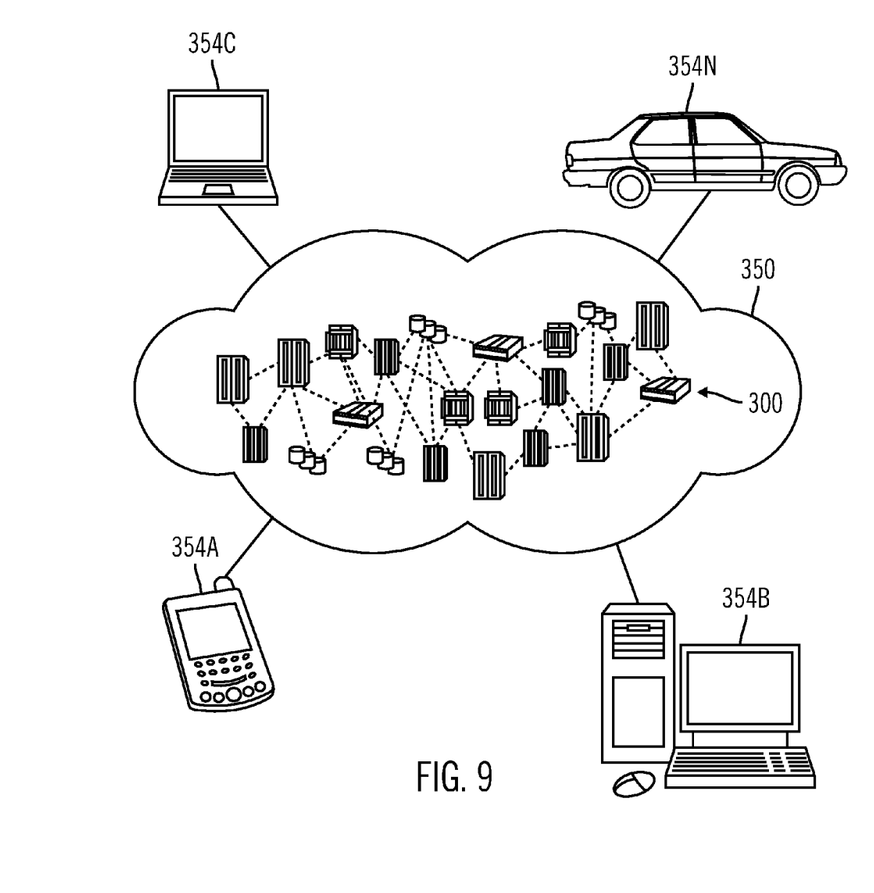
FIG. 9 illustrates an embodiment of a cloud computing environment.

Referring now to FIG. 9, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 9 are intended to be illustrative only and that computing nodes 300 and cloud computing environment 350 can communicate with any type of computerized device over any type of network and/or network addressable connection (e.g., using a web browser).

Figure 10:
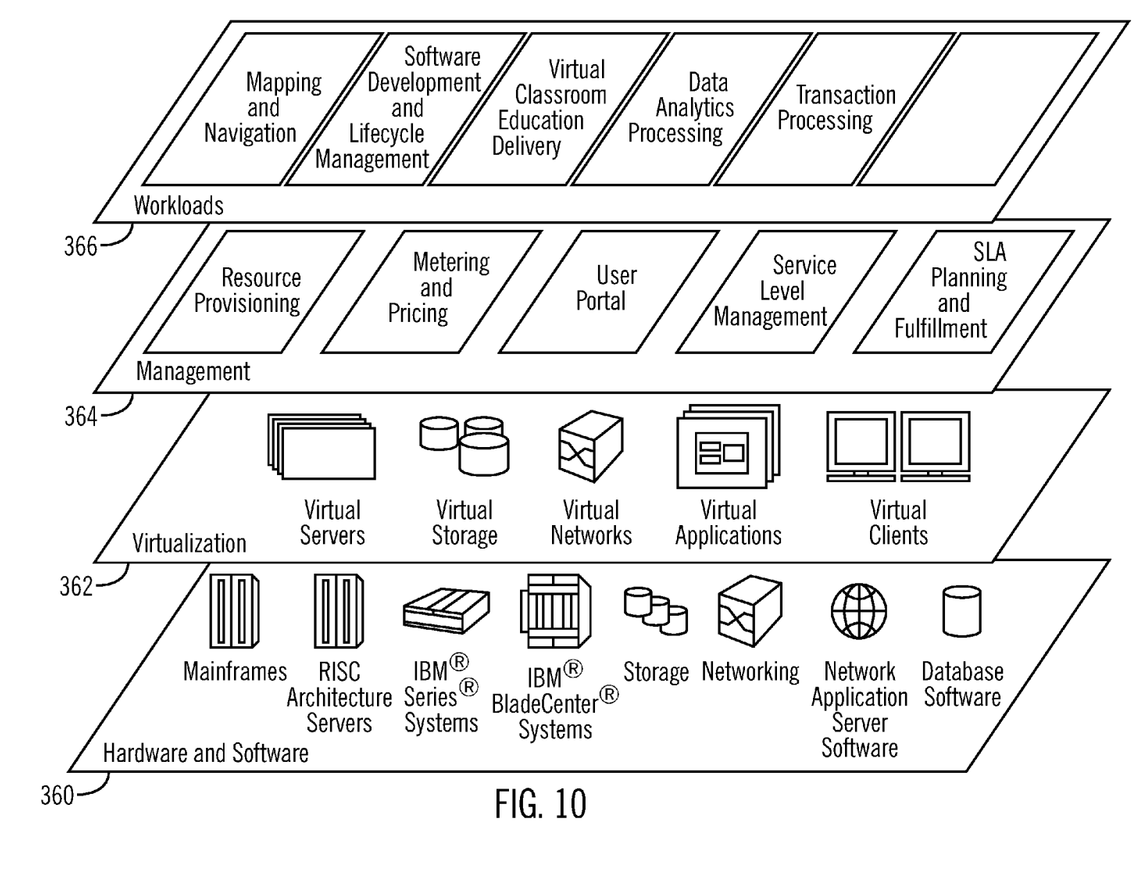
FIG. 10 illustrates an embodiment of abstraction model layers of a cloud computing environment.

Referring now to FIG. 10, a set of functional abstraction layers provided by cloud computing environment 350 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the client 14 and server 16 backup manager services, such as described with respect to FIGS. 1-5, 6a, 6b, 6c, 6d, 7a, and 7b, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 7a, and 7b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing modifications to a data set in storage, the computer program product comprising a non-transitory computer readable storage medium having computer readable program code embodied therein that executes to perform operations, the operations comprising:
    maintaining information on a data set of variable length chunks, including a digest of each chunk and information to locate the chunk in the data set;
    receiving modifications to at least one chunk in a range of chunks in the data set;
    determining the at least one chunk in the range including data affected by the modifications in the range of chunks;
    processing the determined at least one chunk in the range including data affected by the modifications to determine at least one new chunk in the range having a different layout in the range than the at least one determined chunk before the modifications, wherein the at least one new chunk can have more or less data than the determined at least one chunk had before the modifications;
    for each of the at least one determined new chunk, determining new digest information of the new chunk; and
    adding to the set information the new digest information on the at least one new chunk and information to locate the new chunk in the data set.

2. The computer program product of claim 1, wherein the determining the at least one chunk including data affected by the modifications comprises determining at least one range of the determined at least one chunk, and wherein processing the determined at least one chunk including data affected by the modifications to determine the at least one new chunk comprises processing the chunks in the at least one range and processing chunks outside of the at least one range that have data affected by the modifications.

3. The computer program product of claim 1, wherein a number of the determined at least one new chunk has changed from a number of the determined at least one chunk before the modifications.

4. The computer program product of claim 1, wherein at least one of the determined new chunks are located at different boundaries in the data set than a location of the determined at least one chunk before the modifications.

5. The computer program product of claim 1, wherein the operations further comprise:
    determining whether the determined at least one new chunk is stored in a backup server; and transmitting the determined at least one new chunk not stored in the backup server to the backup server to store.

6. The computer program product of claim 5, wherein the operations further comprise:
transmitting to the backup server the digest of each of the determined at least on new chunk and information to locate the determined at least one new chunk in the data set to include in a copy of the data set information at the backup server.

7. A system for processing modifications to a data set in a storage, comprising:
at least one processor; and
a backup manager executed by the processor to perform operations, the operations comprising:
maintaining information on a data set of variable length chunks, including a digest of each chunk and information to locate the chunk in the data set;
receiving modifications to at least one chunk in a range of chunks in the data set;
determining the at least one chunk in the range including data affected by the modifications in the range of chunks;
processing the determined at least one chunk in the range including data affected by the modifications to determine at least one new chunk in the range having a different layout in the range than the at least one determined chunk before the modifications, wherein the at least one new chunk can have more or less data than the determined at least one chunk had before the modifications;
for each of the at least one determined new chunk, determining new digest information of the new chunk; and
adding to the set information the new digest information on the at least one new chunk and information to locate the new chunk in the data set.

8. The system of claim 7, wherein the determining the at least one chunk including data affected by the modifications comprises determining at least one range of the determined at least one chunk, and wherein processing the determined at least one chunk including data affected by the modifications to determine the at least one new chunk comprises processing the chunks in the at least one range and processing chunks outside of the at least one range that have data affected by the modifications.

9. The system of claim 7, wherein a number of the determined at least one new chunk has changed from a number of the determined at least one chunk before the modifications.

10. The system of claim 7, wherein at least one of the determined new chunks are located at different boundaries in the data set than a location of the determined at least one chunk before the modifications.

11. The system of claim 7, further in communication with a backup server, wherein the operations further comprise:
determining whether the determined at least one new chunk is stored in a backup server; and
transmitting the determined at least one new chunk not stored in the backup server to the backup server to store.

12. The system of claim 11, wherein the operations further comprise:
transmitting to the backup server the digest of each of the determined at least one new chunk and information to locate the determined at least one new chunk in the data set to include in a copy of the data set information at the server backup manager.

13. A method for processing modifications to a data set in storage, comprising:
maintaining information on a data set of variable length chunks, including a digest of each chunk and information to locate the chunk in the data set;
receiving modifications to at least chunk in a range of chunks in the data set;
determining the at least one chunk in the range including data affected by the modifications in the range of chunks;
processing the determined at least one chunk in the range including data affected by the modifications to determine at least one new chunk in the range having a different layout in the range than the at least one determined chunk before the modifications, wherein the at least one new chunk can have more or less data than the determined at least one chunk had before the modifications;
for each of the at least one determined new chunk, determining new digest information of the new chunk; and
adding to the set information the new digest information on the at least one new chunk and information to locate the new chunk in the data set.

14. The method of claim 13, wherein the determining the at least one chunk including data affected by the modifications comprises determining at least one range of the determined at least one chunk, and wherein processing the determined at least one chunk including data affected by the modifications to determine the at least one new chunk comprises processing the chunks in the at least one range and processing chunks outside of the at least one range that have data affected by the modifications.

15. The method of claim 13, wherein a number of the determined at least one new chunk has changed from a number of the determined at least one chunk before the modifications.

16. The method of claim 13, wherein at least one of the determined new chunks are located at different boundaries in the data set than a location of the determined at least one chunk before the modifications.

17. The method of claim 13, wherein the operations further comprise:
determining whether the determined at least one new chunk is stored in a backup server; and
transmitting the determined at least one new chunk not stored in the backup server to the backup server to store.

18. The method of claim 17, wherein the operations further comprise:
transmitting to the backup server the digest of each of the determined at least one new chunk and information to locate the determined at least one new chunk in the data set to include in a copy of the data set information at the backup server.

* * * * *